United States Patent [19]
Leblond et al.

[11] 3,839,115
[45] Oct. 1, 1974

[54] TIRE BEAD HOLDING APPARATUS AND METHOD

[75] Inventors: Jean Rene Leblond; Guy Emile Danneels, both of Compiegne; Maurice Avrelien Lambert, Machemont, all of France

[73] Assignee: Uniroyal S.A., Clairoix, France

[22] Filed: June 23, 1972

[21] Appl. No.: 265,876

[30] Foreign Application Priority Data
July 13, 1971  France .............................. 71.25786

[52] U.S. Cl. ................................. 156/131, 156/403
[51] Int. Cl. ....................B29h 17/12, B29h 17/22
[58] Field of Search .......... 156/131, 132, 135, 398, 156/403

[56] References Cited
UNITED STATES PATENTS

| | | |
|---|---|---|
| 2,790,481 | 4/1957 | Beckadolph et al. ................ 156/131 |
| 3,082,811 | 3/1963 | Borglin et al. ...................... 156/403 |
| 3,121,653 | 2/1964 | Treraskis ......................... 156/131 X |
| 3,434,897 | 3/1959 | Caretta et al. ...................... 156/403 |

OTHER PUBLICATIONS

Webster's Third International Dictionary, page 732, G. & C. Merriam Co., Springfield, Mass., 1961.

Primary Examiner—Clifton B. Cosby
Attorney, Agent, or Firm—Jack Posin, Esq.

[57] ABSTRACT

A device including means for gripping wire tire beads including electromagnets for magnetically attracting and holding the beads. The device is to be employed with a conventional tire making machine. Means are provided for moving said gripping means back and forth and sideways to position the gripping means to dispose the beads within the grooves of the rotary drum on which the tire carcass is formed.

18 Claims, 17 Drawing Figures

TIRE BEAD HOLDING APPARATUS AND METHOD

BACKGROUND OF THE INVENTION

1. Field of the Invention

This invention relates to a device for gripping and positioning tire beads on the rotary drum of a tire making machine.

2. The Prior Art

Devices for gripping tire beads have been known, and at least one U.S. Pat. No. 2,790,481 employs tong-like holders. However, no prior art device is known which holds the bead wire by electromagnetism to provide temporary bead support while maintaining the position and orientation of the bead wire during the expansion of the rotary drum.

SUMMARY OF THE INVENTION

This invention relates to a device for holding a wire tire bead. The device is designed to be combined with an essentially horizontal rotary drum of a tire building apparatus which drum is the building unit for pneumatic tire casings or the like. Preferably, the tire building apparatus and the device are at least partially automatic or programmed. Although this bead-holder device can be employed with any type of tire-casing building machine, it is more particularly designed to be incorporated into a manufacturing machine that comprises a single-cycle, single-phase, or single-stage unit for building pneumatic tire casings, for example, for heavy utility vehicles, and which specifically includes a drum that comprises a radially expandable or similar building unit of the type described, for example, in French Patent Application No. 71-25784, dated July 13, 1972, now French patent 71.25784 issued Feb. 23, 1973, in the name of the assignee of the present application.

This invention provides a bead-holder device for transferring and installing prefabricated wire beads for a pneumatic tire casing or carcass that is built and mounted on the above-indicated building drum according to a "flat" configuration, that is in the form of an essentially cylindrical band. The device is designed to accomplish the temporary holding of the wire beads by electromagnetism and gives rise to the possibility of using completely finished prefabricated wire beads, i.e., rubber-coated or braided wires that have been trimmed and supplied with their rubber packing that comprises a cap or top. Additionally, the invention achieves precise positive positioning of the wire beads during radial expansion of the building drum and facilitates the embedding of these wire beads in corresponding bead grooves provided on the surface of said drum. For this purpose, the wire-holder device according to the invention has two wire-holder grips equipped to hold the wires by electromagnetic attraction and which respectively move back and forth, both perpendicular and parallel to the axis of rotation of the building drum.

The above features are achieved by a structure wherein the wire-holder device includes a stationary supporting frame that is arranged essentially symmetrically relative to the median transverse vertical plane of the building drum; two carriages that move on said stationary supporting frame back and forth along a path parallel to the longitudinal axis of the drum, preferably synchronously in opposite directions and symmetrically relative to the median plane of the frame; and two grip-holder carriages that move respectively on said longitudinally moving carriages back and forth along paths perpendicular to the axis of rotation of said drum. The grip-holder carriages each carry a wire-holder grip and control and drive servomotors, which respectively comprise actuators, shifters or positioners for the above-indicated moving parts.

These devices offer the advantage of having a simple and economic design and a reliable and efficient performance.

BRIEF DESCRIPTION OF DRAWINGS

FIGS. 11–15 respectively are somewhat schematic views of a machine for building pneumatic tire casings shown in different successive positions to illustrate the sequence of operation of the wire-holder device according to the invention.

DETAILED DESCRIPTION OF THE PREFERRED EMBODIMENT

Figure 1:
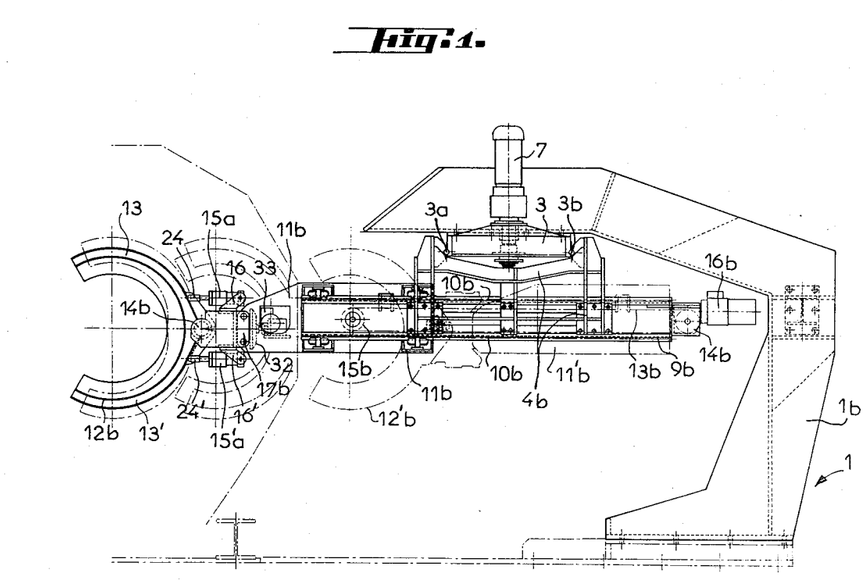
FIG. 1 is a side elevation view of a wire bead-holder device according to the invention, looking in the direction of the arrow I in FIG. 2.
Figure 2:
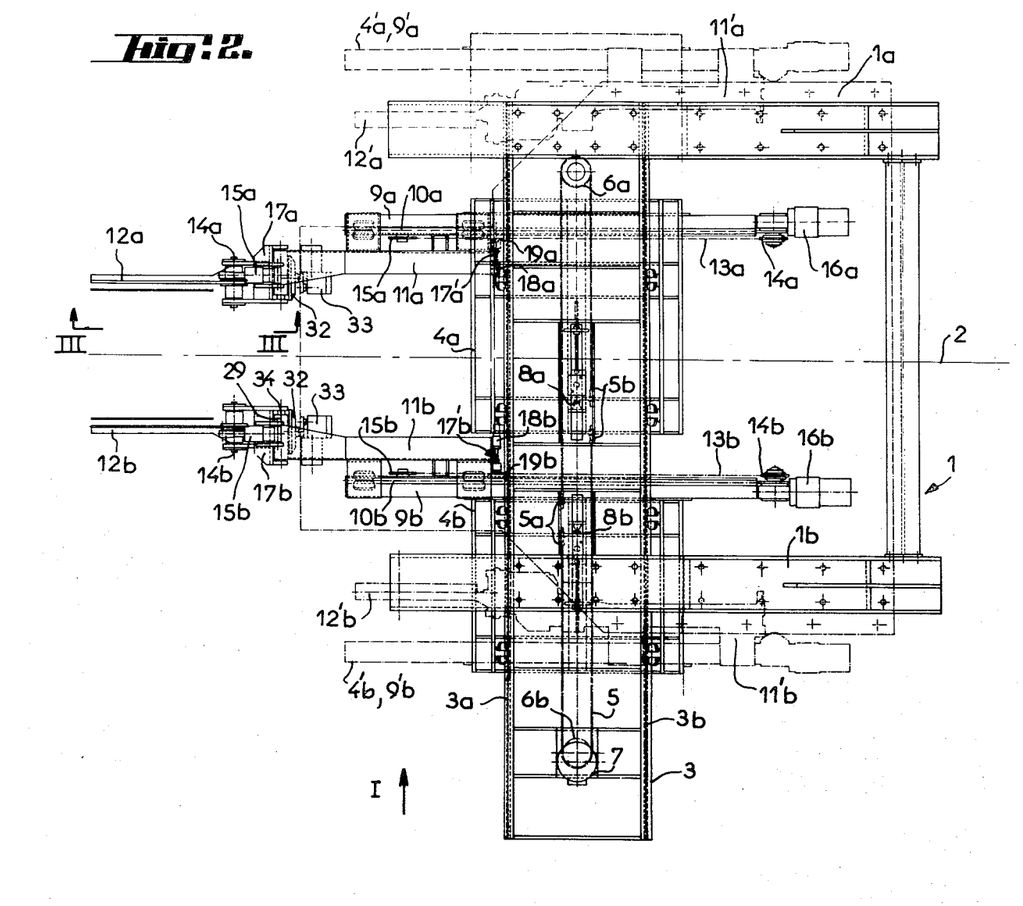
FIG. 2 is a top plan view of the device.

Referring now to the drawings in detail and particularly to FIGS. 1 and 2 thereof, the wire bead-holder device of this invention includes a stationary frame 1 that is at least approximately symmetric relative to its median transverse vertical plane 2 which preferably coincides with the vertical median plane of the horizontal rotary building drum of the machine for fabricating pneumatic tire casings (see FIGS. 11 to 15). The machine for fabricating pneumatic tire casings may be of any convenient and suitable form. An example of such a machine is the machine described in said French Patent Application No. 71-25784, which application is assigned to the assignee hereof. The machine described in said French Patent Application No. 71-25784 is preferred for cooperation with the device of the present invention.

Stationary frame 1 includes two main support members 1a, 1b which are spaced apart and extend transversely of the axis of rotation of the building drum, i.e., parallel to the vertical plane of symmetry 2. Members 1a and 1b support a longitudinal beam 3 that includes two guide tracks or slides 3a and 3b that are essentially horizontal, rectilinear, parallel and spaced apart. Slides 3a and 3b extend parallel to the axis of rotation of the building drum. Movably disposed on slides 3a and 3b are two longitudinally moving carriages 4a and 4b. Carriages 4a and 4b are thus suspended from the beam 3 and can be shifted along its length. As will be described hereinafter, means are provided for shifting carriages 4a and 4b simultaneously or synchronously in opposite directions, i.e., symmetrically relative to the median vertical plane 2. For that purpose, the two carriages are driven by a drive chain or cable 5 that passes in the form of an endless loop over two sprockets or pulleys 6a and 6b. Preferably, sprocket 6a is an idler and sprocket 6b is a driving sprocket although this could be reversed. The vertical axes of rotation of the two sprockets are located adjacent the two opposite longitudinal ends of the beam 3, so that the two parallel flights of the chain 5 extend parallel to the slides 3a, 3b. The two longitudinal-travel carriages 4a and 4b are respectively connected to different parallel flights of the drive chain 5, as at 5a and 5b respectively, and the driving sprocket 6b is connected to an electric gear motor 7 mounted on the beam 3 for turning the sprocket 6b. Thrust stops 8a and 8b limit how close the carriages 4a, 4b can get to each other and this close position is represented by solid lines in FIG. 2.

Each carriage 4a and 4b in turn includes a beam 9a and 9b respectively that extends transversely of the axis of rotation of the building drum, i.e., parallel to the median vertical plane 2, and is provided with at least one slide or similar guide track 10a and 10b respectively along which transversely traveling grip-holder carriages 11a and 11b can slide. Grip-holder carriages 11a and 11b are thus supported by beams 9a and 9b. Moreover, grip-holder carriages 11a and 11b carry wire beadholder grips 12a and 12b, respectively. Preferably, each beam 9a and 9b is provided with two linear guide slides that are parallel and vertically spaced, as may best be seen in FIG. 1. The reciprocal motion of each gripholder carriage 11a and 11b in two opposite directions is preferably achieved by means of a drive chain or cable 13a and 13b respectively that extends along the respective beam 9a and 9 b and passes in the form of an endless loop over a pair of pulleys or sprockets, i.e., a driving pair 14a and 14b and a driven pair 15a and 15b, respectively, all with horizontal axes of rotation parallel to the axis of rotation of the building drum and respectively mounted at the opposite ends of the beams 9a and 9b. One flight of this drive chain is connected to the associated grip-holder carriage 11a and 11b, and driving pulley or sprocket 14a, 14b is connected to an electrical gear motor 16a and 16b respectively that is mounted on beam 9a and 9b.

Each grip-holder carriage 11a, 11b is preferably provided with at least one locking device 17'a, 17'b respectively which is designed to recenter and lock or immobilize the grip-holder carriage in a predetermined position relative to the corresponding longitudinal-travel carriage 4a, 4b. For example, lock 17'a and 17'b may lock grip-holder carriages 11a and 11b in the position of maximum approach or advance toward the building drum, which is located at the left in FIGS. 1 and 2. This position is represented by the solid line drawing in FIG. 2. Each locking device 17'a, 17'b preferably includes a compressed-fluid liner jack 18a, 18b. The cylinders of jacks 18a and 18b are attached, for example, to the associated grip-holder carriage 11a, 11b and the piston rods are connected to a locking pin. The locking pins are aligned lengthwise with the piston rods and comprise a bolt that can penetrate into a locking catch or a similar retainer 19a and 19b that are respectively built into the beams 9a and 9b of the associated longitudinal-travel carriage 4a and 4b.

In FIGS. 1 and 2, the solid lines represent the longitudinal-travel carriages 4a and 4b with their beams 9a and 9b in their positions of closest mutual approach and the grip-holder carriages 11a, 11b in their maximum advanced or extended positions at the left in FIGS. 1 and 2 toward the building drum. FIG. 2 also shows, by means of broken dash-dot line representations of components 4'a, 9'a, and 4'b, 9'b, the respective relative positions of maximum mutual deviation of the carriages 4a and 4b with their beams 9a and 9b, and with the grip-holder carriages 11'a and 11'b and their associated grips 12'a and 12'b represented in their respective retracted or return positions, i.e., at a maximum distance from the building drum.

Figure 3:
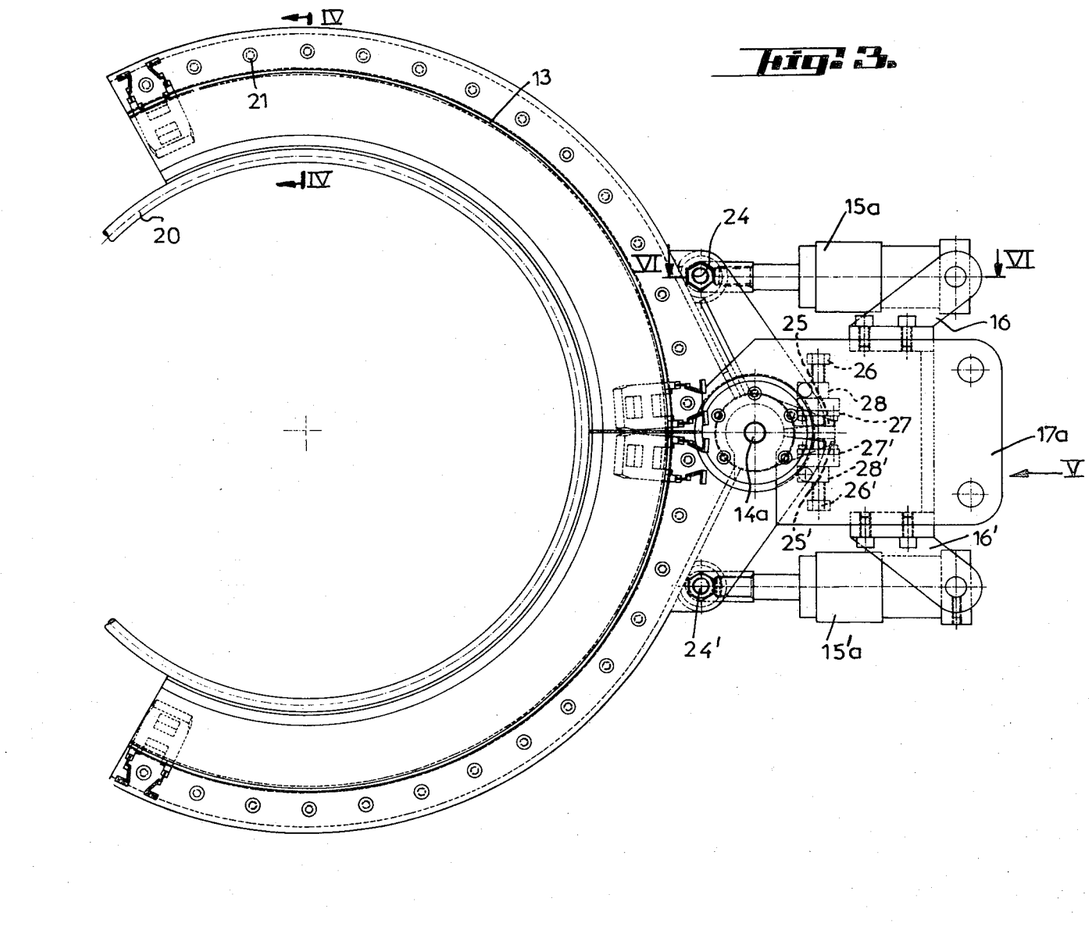
FIG. 3 is a fragmentary side elevational view, in enlarged scale, of the wire bead-holder grip with its support and its controls, taken along the line III—III in FIG. 2.

As FIGS. 1 and 3 show, each wire bead-holder grip 12a and 12b has two branches 13, 13' each preferably arcuate in shape and extending over an arc of, for example, 120°. Branches 13 and 13' of each grip 12a and 12b are hinged at a common pivot pin 14a and 14b respectively that are preferably horizontal and parallel to the axis of rotation of the building drum, so as to pivot in a vertical plane in order to grasp said drum. The two wire bead-holder grips 12a and 12b are actuated into concomitant pivotal movement to widen and narrow the grips by two individual synchronized servomotors (not shown). For each grip there are advantageously two compressed-fluid linear jacks 15a, 15'a and 15b, 15'b, respectively, which are hingedly mounted on linklike mounts 16 and 16', respectively, which are in turn parts of grip supports 17a and 17b. Grip supports 17a and 17b are connected to corresponding grip-holder carriages 11 a and 11b. The two control jacks 15a–15'a or 15b–15'b for each grip are preferably arranged above and below the associated pivot pin 14a and 14b.

Figure 4:
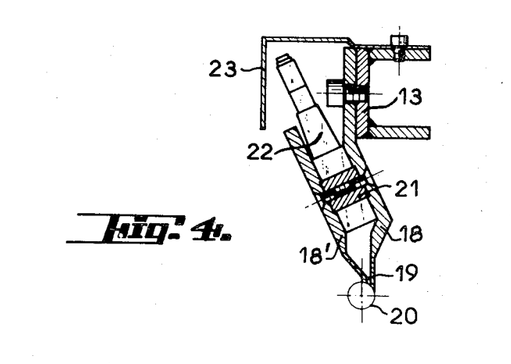
FIG. 4 is a sectional view taken along line IV—IV in FIG. 3.

As FIG. 4 best shows, each branch of the wireholder grip 13, 13' includes two shaped magnetic pole pieces 18 and 18' which comprise magnetizable armatures separated by an air gap 19 at their radially inner periphery to form a magnetic circuit the reluctance of which can be sharply reduced by the wire bead 20 bridging gap 19 whereby to grip and hold magnetically said bead. Pole pieces 18 and 18' are connected together by bridging elements that include circumferentially spaced spacers 21 and the cores for electromagnetic excitation coils 22, so that the assembly constitutes a true electromagnet. The two magnetizable pole pieces 18, 18' of each grip branch are attached to the arcuate structural elements 13 and 13' that forms the branch which also carries a continuous protective cover 23 which covers and shields the excitation coils 22.

Figure 5:
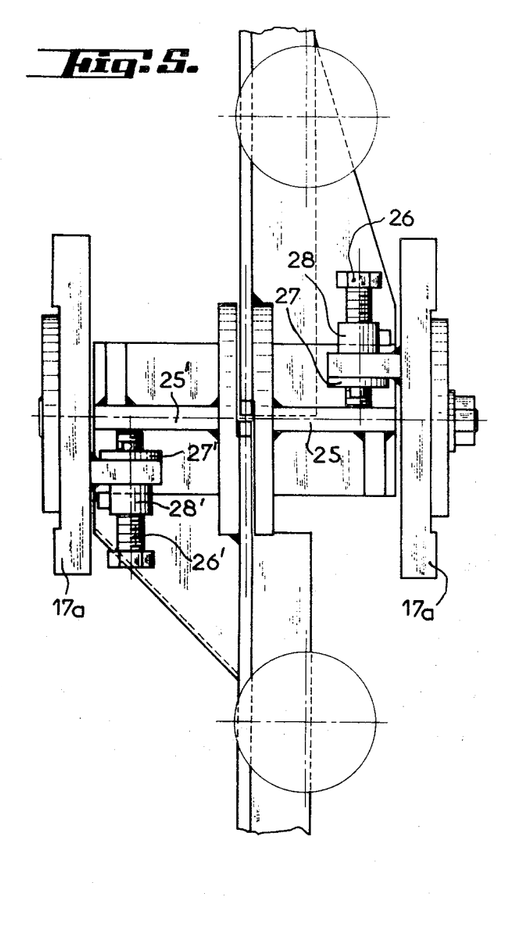
FIG. 5 is a rear elevational view of the wire bead-holder grip, looking in the direction of the arrow V in FIG. 3.
Figure 6:
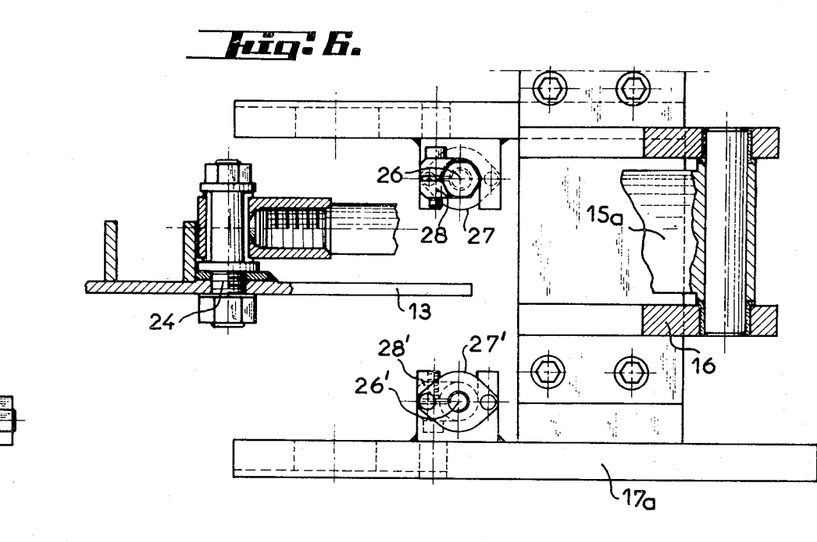
FIG. 6 is a cross-sectional view taken along the line VI—VI in FIG. 3.

The piston rods of jacks 15a–15'a and 15b–15'b are respectively hinged at pivots 24 and 24' to the respective branches 13 and 13' of each grip, as may be seen in FIG. 6. The grip branches 13 and 13' are built into essentially horizontal plates in the form of brackets 25 and 25' (see FIGS. 3 and 5) together with which cooperates, by direct engagement, adjustable stops 26 and 26' respectively that preferably include a vertical set screw or the like whose position can be selectively varied. Thus, the set screws may be screwed into fixed nuts 27 and 27' attached to cross plates 50, 50' that are built into the adjacent flanges of the grip supports. Each screw may be locked in the selected or desired position, for example, by means of a clamp collar or a split ring 28 and 28' that can be retightened by an appropriate transverse screw. The two stops 26 and 26' of each grip make it possible to define exactly and adjust the mutual relative position of the grip branches in their closed position.

Figure 7:
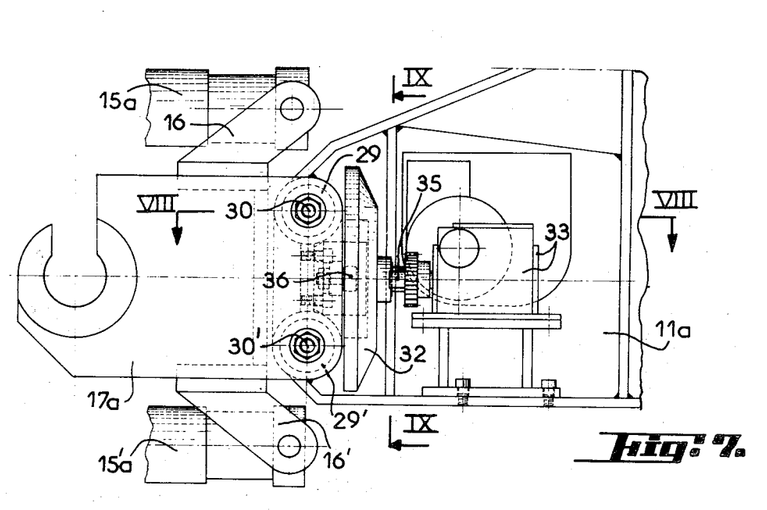
FIG. 7 is a side elevational view of a wire bead-holder grip support and the mechanism for imparting longitudinal movement thereto.
Figure 8:
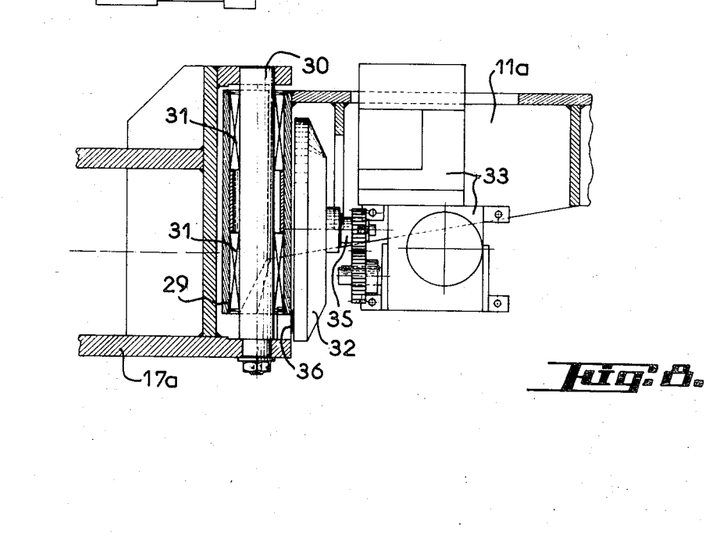
FIG. 8 is a cross-sectional view taken along the line VIII—VIII in FIG. 7.
Figure 9:
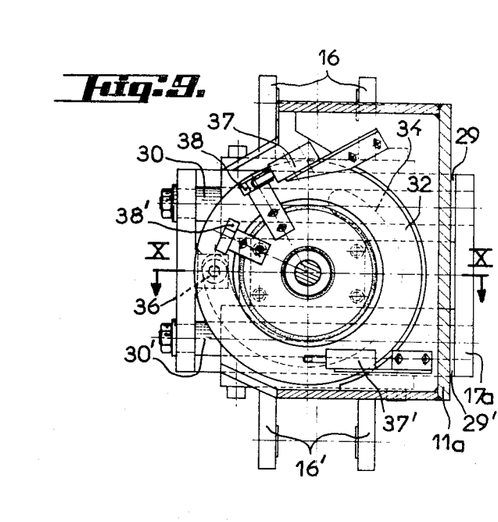
FIG. 9 is a cross-sectional view taken along the line IX—IX in FIG. 7.
Figure 10:
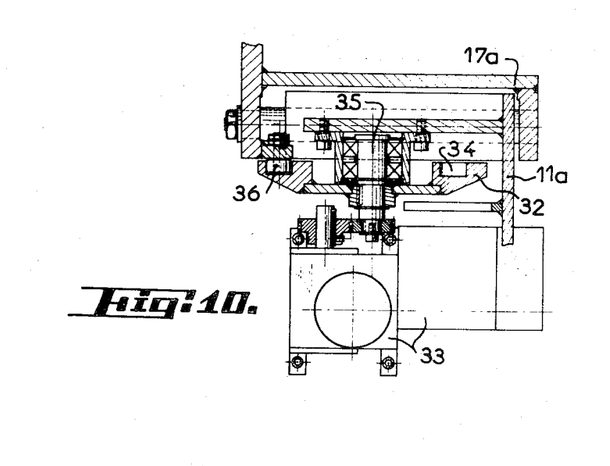
FIG. 10 is a cross-sectional view taken along the line X—X in FIG. 9.
Figure 11:
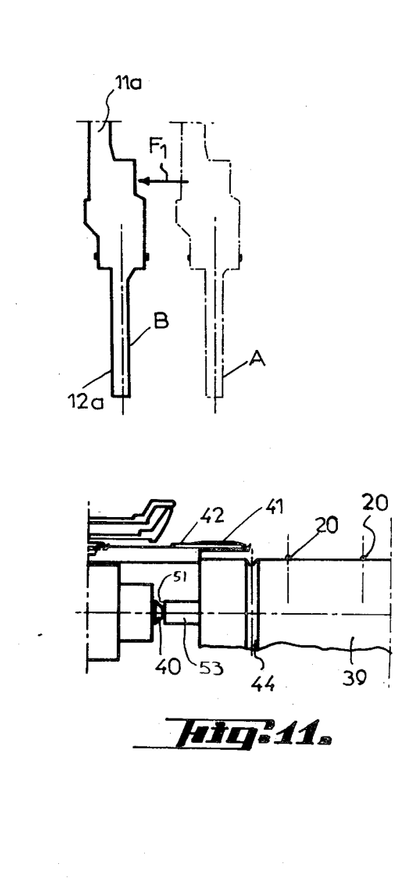

Each grip 12a and 12b with its associated mount 16 and 16' and its support 17a, 17b, can be moved back and forth parallel to the axis of rotation of the building drum relative to grip-holder carriages 11a and 11b. For this purpose, each grip support 17a and 17b, which preferably includes two braced main flanges that are vertically spaced and parallel, can slide longitudinally over guides that are essentially parallel to the axis of rotation of the building drum and are carried by the associated grip-holder carriage 11a, 11b. These guides may be formed, for example, by at least one and preferably two longitudinal slides which preferably are respectively formed by two tubular sleeves or bushings 29, 29' (FIGS. 7 and 8) that are built into the associated grip-holder carriage 11a, 11b. In each sleeve 29, 29' is slidably mounted an axle or shaft 30, 30' that is built into the associated grip support 17a and 17b and can thus slide relative to the corresponding grip-holder carriage 11a, 11b. To reduce friction, ball-bearing rings 31 are preferably inserted between each guide slide 29, 29' and the associated axially sliding shaft 30, 30' (see FIG. 8). The two guide slides 29 and 29' and their associated sliding shafts 30 and 30' of each grip support are preferably disposed in vertically spaced relation from each other as shown in FIG. 7, in which the grip support 17a has been represented without its associated grip. The parallel reciprocating motion of each grip support 17a and 17b in either direction relative to its associated gripholder carriage 11a and 11b is preferably achieved through the action of a rotary plate 32 with a horizontal axis of rotation oriented perpendicular to the axis of rotation of the building drum. Each rotary plate 32 faces the rear end of its associated grip support 17a and 17b. Each plate 32 is preferably connected to a gear motor 33 mounted on the associated grip-holder carriage 11a, 11b and which imparts reversible rotation to the corresponding plate 32. Each plate 32 is further provided, on its surface facing the adjacent grip support 17a and 17b, with a cam slot or forced bilateral guide groove 34 (see FIGS. 9 and 10) which is off-center relative to the horizontal axes of rotation 35 of the plates 32. A rotary cam follower 36 is in permanent rolling engagement with the cam slot 34. Cam follower 36 is carried by the associated grip support 17a, 17b (see FIG. 10). The two opposite limiting angular positions of each revolving plate 32 are advantageously defined by two electrical limit switches or contacts 37, 37' attached to the associated grip-holder carriage 11a, 11b. The limit switches are capable of being actuated by two corresponding lifters or cams 38, 38' attached to the moving plate 32. These electrical limit switches act on the electric motor of the associated gear motor unit 33 that comprises a revolving servomotor.

As is well known in the art of tire making, machinery for making tires, such as that described in said aforementioned French Patent Application No. 71-25784, commonly have a rotary drum, an inflatable bladder overlying the drum surface, and a pair of spaced apart circumferential grooves for receiving the beads during formation of the tire. The purpose of the present invention is to locate the bead wires accurately with respect to the grooves and to maintain the location precisely until the bead wires are completely embedded in the grooves.

In FIGS. 11–15, only the left wire bead-holder grip 12a is represented, as well as only the left part of the building drum 39. From the above description, the operation of the right wire bead-holder grip can be radily inferred by the skilled art worker. With reference to FIGS. 11 to 15, the wire bead-holder device operates as follows. Grips 12a and 12b are initially in the retracted position A represented by the dot-dash lines in FIG. 11 and the operator temporarily places the wire beads 20 on the building drum 39 so that they surround the latter. The axially movable rotating counterpoint 40 of the manufacturing machine is then advanced so as to rotationally support the overhanging free end 51 of the horizontal shaft 53 of the building drum 39. The sidewalls 41 of the carcass are then installed on inflatable bladder or bag 42 and, during this operation, the longitudinal-travel carriages 4a, 4b are moved to further space apart the grips 12a and 12b, specifically in the direction of arrow $F_1$ for grip 12a, which thus moves from position A to position B, which is indicated by the solid lines in FIG. 11.

Figure 12:
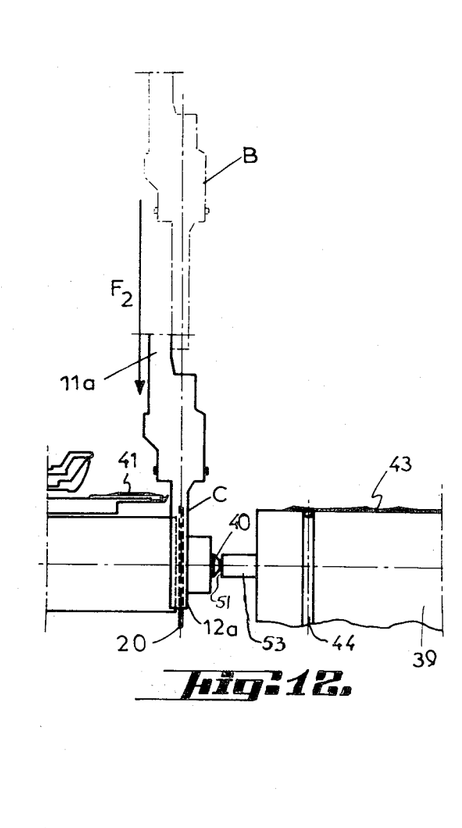

The conventional jacks of the manufacturing machine, which position the sidewalls 41 and the underlying inflatable bladder 42 relative to the building drum 39, are then retracted toward the extreme left in FIG. 12 and the grip-holder carriages 11a and 11b are advanced to positions in which the grips are disposed on opposite sides of the building drum 39 by being moved from position B to position C in the direction of arrow $F_2$. The operator can then install the wire beads 20 in the grips and then supply electrical current to the electromagnet coils inserted in the grip branches to produce magnetic attraction of the wire beads 20, which are then retained by magnetization in the grips during the entire operation of flat-building of the carcass on the building drum 39. The grips are then located essentially coaxially with the building drum 39, but exterior of the latter. After installing the various components or layers 43 of the carcass on the building drum 39, the axial carriages 4a, 4b are maneuvered so as to move the grips 12a and 12b toward each other from position C to position D in FIG. 13 in the direction of arrow $F_3$ for grip 12a. In position D, the supported bead wires 20 surround the building drum 39 respectively at the sites where they are coaxial with but radially spaced from the carcass layers 43 before being embedded in the corresponding grooves 44 of the building drum 39 upon initial expansion of the drum. This exact position of the axial carriages 11a, 11b, which is called the initial expansion position, is achieved with a high degree of accuracy by mechanical locking and recentering of each carriage 11a, 11b.

Figure 13:
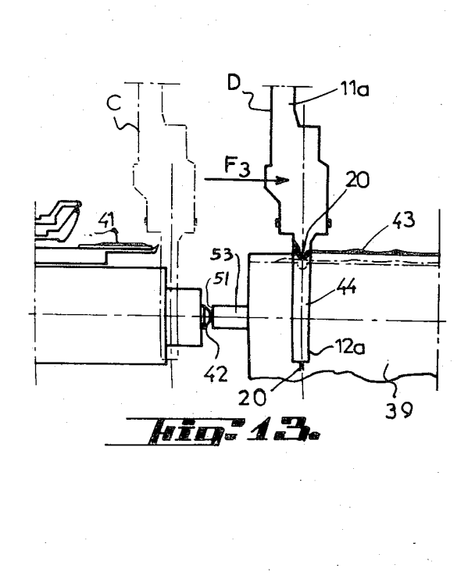
Figures 14A, 14C:
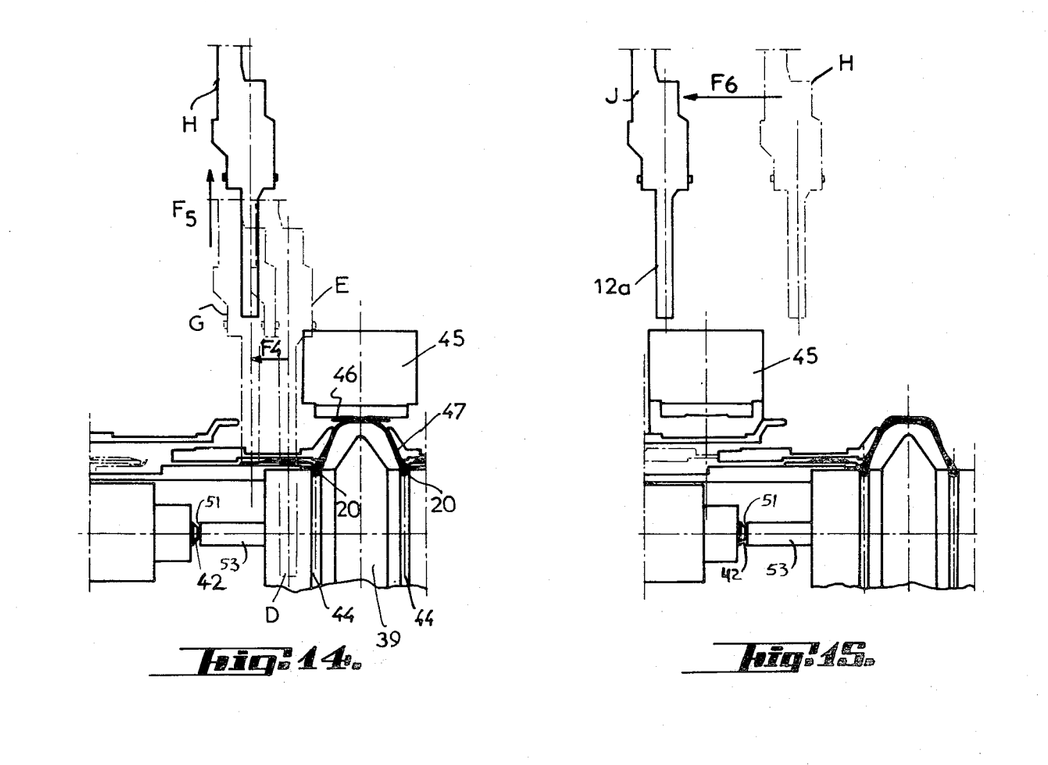
Figure 16:
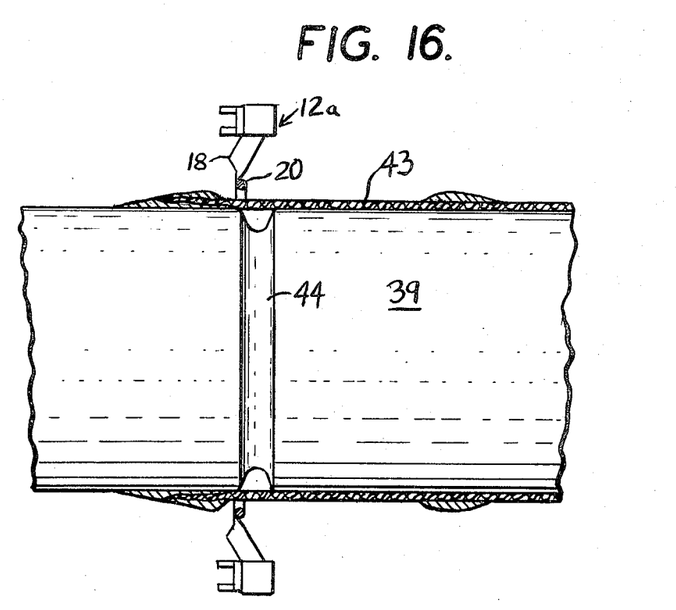
FIGS. 16 and 17 are somewhat diagrammatic views of a machine for building pneumatic tire casings showing the manner in which the bead wires are incorporated into the carcass.
Figure 17:
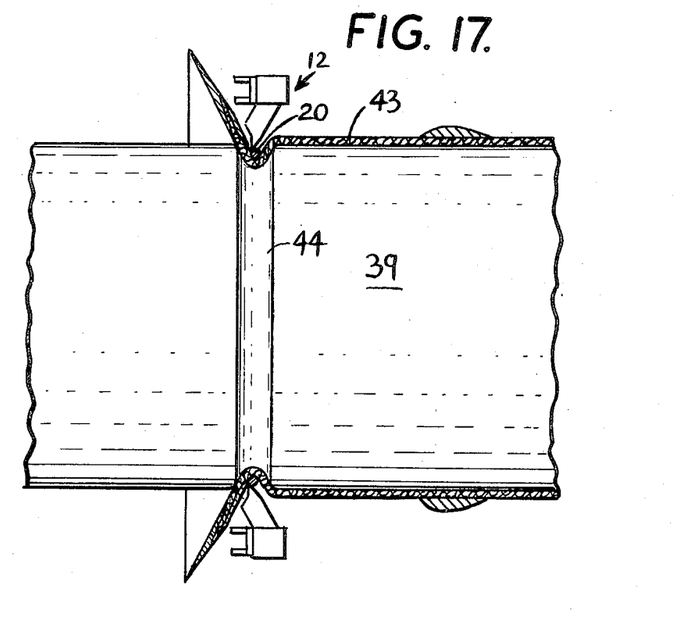

Initial radial expansion of the building drum 39 from the broken line to the solid line position shown in FIG. 13 then occurs, together with concomitant accompanying axially inward motion of the wire-holder grips, the latter resulting from rotation of the cam plates 32. Prior to this expansion of the drum and inward movement of the wire beads 20, the beads are disposed slightly axially outwardly of the planes of the grooves 44 that are on the building drum 39 (FIG. 16). The inward movement facilitates the embedding of each wire bead 20 in the carcass layers at its corresponding groove 44 upon the initial expansion of the drum 39. The rotation of cam plates 32 and concomitant movement of grip support 17a, 17b, occurring concurrently with initial expansion of the drum enables the carcass layers to be perfectly turned back on the wire beads 20 without any static friction or distortion, whereby the plane of each wire bead 20 is merged with the median plane of its corresponding groove 44 at the end of the initial radial expansion of the building drum 39 (FIGS. 13 and 17).

When the operation initially expanding the building drum 39 is terminated, the electrical current that supplies the electromagnet coils 22 of the grips is cut off. The grips are then opened by means of their associated jacks 15, 15' to release the wire beads 20 and are radially retracted by means of carriages 11a, 11b to successively change from position D to position E in FIG. 14. The carriages 11a and 11b are separated by a corresponding motion of carriages 4a, 4b to change from position E to position G in the direction of arrow $R_4$, for grip 12a in FIG. 14. Then, they are retracted by a corresponding movement of carriages 11a, 11b to change from position G to position H in the direction of arrow $F_5$. Following this, the tire building operations continue, during which operations the moving counterpoint 40 is unlocked and the detachable unit of the machine which carries counterpoint 40 is retracted to allow passage of the transfer ring 45 and the reinforcing breaker and the tread of the pneumatic tire casing carried therein. The detachable unit of the machine then returns to its preceding position and is locked, the general jacks are advanced, the carcass-shaping operation is carried out, and the breaker with the tread 46 is installed on the carcass 47.

The grips are then moved laterally by shifting the longitudinal-travel carriages 4a, 4b so as to separate them to thus change from position H to position J in FIG. 15, in the direction of arrow $F_6$, for grip 12a, which makes it possible to release the transfer ring 45 and thus to conduct the carcass-rolling operations and retraction of the general machine jacks. Finally, by maneuvering carriages 4a and 4b, the grips are again brought together to return from the final position J to the initial or starting position A in FIG. 11.

It is thus seen that the combined motions of the axial and radial carriages, respectively, make it possible to guide the wire-holder grips into standby positions that allow for maneuvering of the transferring and rolling devices desirable in the building of a pneumatic tire casing.

The wire-holder device according to the invention thus offers the following advantages:
electromagnetic wire bead holding;
possibility of using wires with a shaped cover;
locking of bead grips in the wire-installing position; and
strict monitoring of the axial position of the wires during their embedding, which prevents any disturbing friction between the carcass layers and the wires.

It will be obvious that in order for the electromagnetic gripping to be effective the bead wire 20 must be made of magnetic material such as, for example, steel.

In FIG. 1, the grip 12b has been represented by solid lines in its advanced, closed position and by dash-dot lines in its radially advanced, open position, at the extreme left of the figure. These two relative positions of grip closing and opening have also been represented in an intermediate position by dash-dot lines and, finally, the grip has been represented in its retracted position at 12b' by dash-dot lines in the same figure.

While we have herein shown and described the preferred embodiment of this invention and have suggested variations therein, other changes and variations may be made therein within the scope of the appended claims without departing from the spirit and scope of this invention.

Having thus described the invention, what is claimed and desired to be protected by Letters Patent is:

1. Apparatus for holding tire beads and for disposing said beads about an expandable rotary drum of a tire building machine, said apparatus comprising:
    a pair of wire bead grips, each of said grips including an electromagnet for magnetically holding a tire bead thereon and each of said grips including a pair of arcuate branches which open and close;
    means for reciprocably moving said grips in a direction perpendicular to the axis of rotation of said rotary drum;
    means for reciprocably moving said grips in a direction parallel to the axis of rotation of said rotary drum; and
    a stationary support frame for said wire bead grips, said frame having a median plane extending transversely of the axis of rotation of said rotary drum, said means for moving said grips parallel to said axis of rotation of said drum comprising a pair of carriages and means for mounting said carriages on said frame for movement relative thereto along paths parallel to said axis of said drum, said means for moving said grips perpendicular to said axis of rotation comprising a pair of grip-holder carriages in supporting relation with each grip and means for mounting said grip-holder carriages on said first mentioned carriages for movement relative thereto in a direction perpendicular to the axis of said drum;
    and means mounted on said grip-holder carriages for moving said branches to open and close said grips.

2. The apparatus of claim 1, wherein said means for moving said grips parallel to said axis further includes means for moving said first mentioned carriages oppositely and synchronously.

3. The apparatus of claim 2, wherein said last mentioned means comprises an endless drive member, one of said carriages being connected to one of the flights thereof and the other of said carriages being connected to the other of the flights thereof.

4. The apparatus of claim 2, further comprising locking means for each of said grip-holder carriages for locking said grip-holder carriages in a predetermined position relative to the first mentioned carriage associated therewith.

5. The apparatus of claim 1, wherein said pair of arcuate branches of each grip has angular extents the sum of which is greater than 180°, and wherein each of said grips includes means for pivotally connecting said branches to their associated grip-holder carriage for movement about an axis that is parallel to said axis of rotation of said drum, and wherein said means mounted on said grip-holder carriages for moving said branches to open and close said grips comprises means for pivotally moving said branches to open and close said grips.

6. The apparatus of claim 5, wherein said branches are each of greater angular extent than 90°.

7. The apparatus of claim 6, wherein said branches each extend about 120°.

8. The apparatus of claim 7, further comprising stop means for limiting the pivotal movement of said branches.

9. The apparatus of claim 6, wherein each of said branches includes a pair of spaced apart, arcuate, magnet pole pieces and an electromagnet extending therebetween.

10. The apparatus of claim 1, further comprising means for moving said grips parallel to said axis of rotation and relative to said grip-holder carriages.

11. The apparatus of claim 10, further comprising means for controlling said last mentioned grip moving means for moving said grips concomitantly with the expansion of said drum.

12. The apparatus of claim 10, wherein said last mentioned grip moving means includes a guide on said gripholder carriage extending parallel to said axis of rotation and a grip support slidably mounted on said guide, and means for moving said grip support on said guide including a rotatable plate having a cam slot therein, a cam follower in engagement with said cam slot, and a servomotor for rotating said plate.

13. The apparatus of claim 9, further comprising a stationary support frame for said wire bead grips, said frame having a median plane extending transversely of the axis of rotation of said rotary drum, said means for moving said grips parallel to said axis of rotation of said drum comprising a pair of carriages and means for mounting said carriages on said frame for movement relative thereto along paths parallel to said axis of said drum, said means for moving said grips perpendicular to said axis of rotation comprising a pair of grip-holder carriages in supporting relation with each grip, and means for mounting said grip-holder carriages on said first mentioned carriages for movement relative thereto in a direction perpendicular to the axis of said drum.

14. The apparatus of claim 13, wherein said means for moving said grips parallel to said axis further includes means for moving said first mentioned carriages oppositely and synchronously.

15. The apparatus of claim 13, further comprising means for moving said grips parallel to said axis of rotation and relative to said grip-holder carriages.

16. The apparatus of claim 15, further comprising means for controlling said last mentioned grip moving means for moving said grips concomitantly with the expansion of said drum.

17. The method of incorporating a bead wire in a tire carcass, said method to be performed on a machine including an expandable rotary drum having a pair of circumferential bead grooves in the surface thereof and apparatus for releasably holding and disposing said bead wire on said tire carcass, said apparatus including a pair of carriages movable longitudinally of said drum, a pair of grip-holder carriages mounted on said carriages and movable relative thereto in a direction perpendicular to the axis of said drum, and a pair of grips, one for each grip-holder carriage, mounted on said grip-holder carriage, said method comprising the steps of:

installing the carcass about said drum in an unexpanded condition;

gripping a pair of bead wires in said grips;

moving said gripped bead wires into surrounding relation with said drum and outboard of said grooves by moving said carriages axially of said drum and by moving said grip-holder carriages relative to said carriages perpendicular to said drum axis; and then expanding said drum and simultaneously moving said grips axially inward of said drum to dispose said bead wires in said grooves and to turn back said carcass on said bead wires.

18. The method of claim 17, wherein said apparatus further includes means for moving said grips relative to said grip-holder carriages in the direction of the axis of said drum, and wherein the step of simultaneously moving said grips axially inward of said drum is performed by moving said grips relative to said grip-holder carriages.

* * * * *